United States Patent
Thomas

(10) Patent No.: US 10,439,375 B2
(45) Date of Patent: Oct. 8, 2019

(54) WELLBORE LINE COATING REPAIR

(71) Applicant: HALLIBURTON ENERGY SERVICES, INC., Houston, TX (US)

(72) Inventor: Sean Gregory Thomas, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 301 days.

(21) Appl. No.: 15/118,387

(22) PCT Filed: Apr. 14, 2014

(86) PCT No.: PCT/US2014/033984
§ 371 (c)(1),
(2) Date: Aug. 11, 2016

(87) PCT Pub. No.: WO2015/160326
PCT Pub. Date: Oct. 22, 2015

(65) Prior Publication Data
US 2017/0149219 A1    May 25, 2017

(51) Int. Cl.
*B05C 3/12*    (2006.01)
*H02G 1/16*    (2006.01)
*B05C 3/15*    (2006.01)

(52) U.S. Cl.
CPC ............... *H02G 1/16* (2013.01); *B05C 3/12* (2013.01); *B05C 3/15* (2013.01)

(58) Field of Classification Search
CPC ............... H02G 1/16; B05C 3/12; B05C 3/15
USPC ............................................................ 118/72
See application file for complete search history.

(56) References Cited

U.S. PATENT DOCUMENTS

| | | | |
|---|---|---|---|
| 2,215,996 A | | 9/1940 | Benton |
| 4,183,888 A | | 1/1980 | Mutzke |
| 4,351,030 A | | 9/1982 | Astfalk et al. |
| 4,552,599 A | * | 11/1985 | Masuda ................ B21C 37/042 156/50 |
| 5,260,104 A | | 11/1993 | Bryant et al. |
| 5,372,858 A | | 12/1994 | Saylor et al. |
| 5,392,861 A | | 2/1995 | Champagne et al. |
| 5,492,583 A | | 2/1996 | Fingerson et al. |
| 5,756,998 A | | 5/1998 | Marks et al. |
| 5,922,399 A | | 7/1999 | Kobayashi |
| 6,187,375 B1 | | 2/2001 | Alders et al. |
| 6,416,813 B1 | | 7/2002 | Valls et al. |
| 6,874,233 B2 | | 4/2005 | Harding et al. |

(Continued)

OTHER PUBLICATIONS

International Patent Application No. PCT/US2014/033984, International Search Report and Written Opinion, dated Jan. 14, 2015, 14 pages.

*Primary Examiner* — Kirsten Jolley
(74) *Attorney, Agent, or Firm* — Kilpatrick Townsend & Stockton LLP

(57) ABSTRACT

Assemblies and methods of use are disclosed for repairing the coating of a coated wellbore line. A wellbore line can be cleaned and then coated with a repair material before being pulled through a die to shape the coating and then being pulled through setting section to set the repair material. The repair material can be a thermoplastic material that is set by cooling, or a thermoset material that is set by heating. The wellbore line can be repaired upon exiting a wellbore or being unspooled from a reel.

20 Claims, 8 Drawing Sheets

(56) References Cited

U.S. PATENT DOCUMENTS

| | | | |
|---|---|---|---|
| 8,256,085 B2* | 9/2012 | Nelson | B21C 1/12 |
| | | | 209/400 |
| 2003/0110612 A1 | 6/2003 | Miyazaki et al. | |
| 2005/0172893 A1 | 8/2005 | Trakowski et al. | |
| 2010/0055456 A1 | 3/2010 | Perera et al. | |
| 2010/0170694 A1 | 7/2010 | Tsotsis et al. | |
| 2010/0189884 A1 | 7/2010 | Kaiser et al. | |
| 2011/0212334 A1 | 9/2011 | Jolley et al. | |
| 2012/0261161 A1 | 10/2012 | Kelley et al. | |
| 2013/0032411 A1* | 2/2013 | John | C09D 127/18 |
| | | | 175/320 |
| 2013/0122296 A1* | 5/2013 | Rose | E21B 23/14 |
| | | | 428/376 |
| 2013/0233587 A1 | 9/2013 | Varkey et al. | |

* cited by examiner

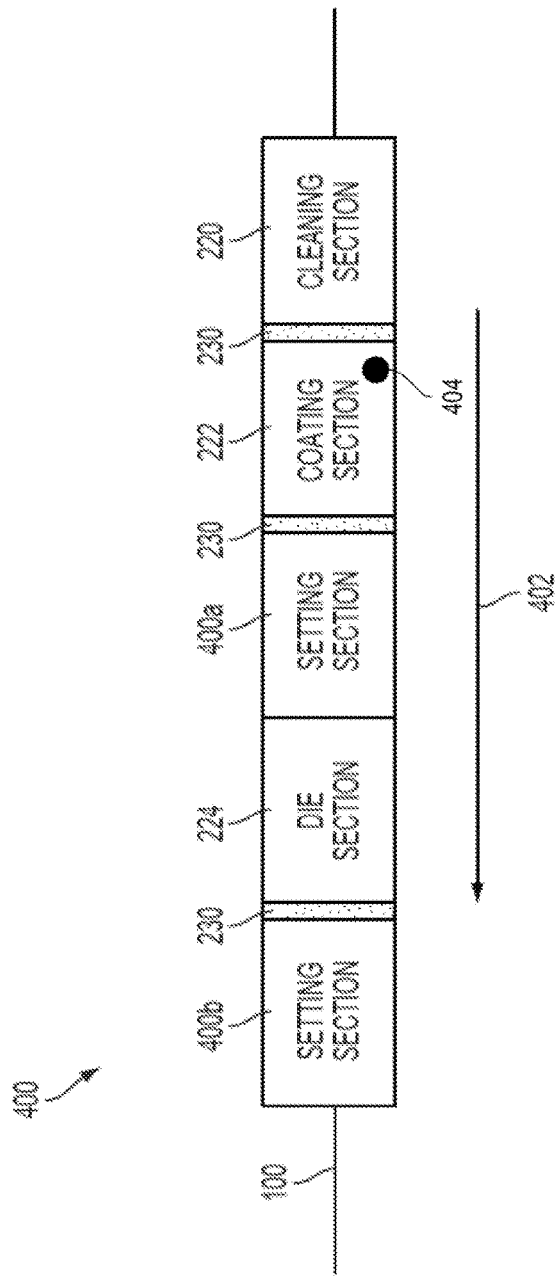

WELLBORE LINE COATING REPAIR

CROSS-REFERENCE TO RELATED APPLICATIONS

This is a U.S. national phase under 35 U.S.C. 371 of International Patent Application No. PCT/US2014/033984, titled "Wellbore Line Coating Repair" and filed Apr. 14, 2014, the entirety of which is incorporated herein by reference.

TECHNICAL FIELD

The present disclosure relates generally to repairing line coatings for wellbore lines. The present disclosure further relates generally to repairing line coatings for wellbore lines as the wellbore lines are entering or exiting a wellbore.

BACKGROUND

Oilfield operations can involve the use of various lines that are inserted into a wellbore for various purposes, such as positioning tools, taking measurements, and other functions. Wellbore lines can include various materials and can include a coating surrounding the surface of the line. These coatings can include thermoplastic materials. These coatings can protect the line from damage, shield an electrically conductive line, protect against fluid intrusion, or perform other purposes. Lines can be placed in, repositioned within, and removed from a wellbore numerous times. The line coating can be susceptible to high thermal gradients, abrasive materials, wellbore fluids, and environments generally harmful to the integrity of the line coating. During use, the coating surrounding a line can become damaged. Lines with damaged coatings can become unusable such that the lines are replaced with new lines.

BRIEF DESCRIPTION OF THE DRAWINGS

FIG. 4 is a diagram illustrating a wellbore line coating repair system having two setting sections according to one aspect of the present disclosure.

DETAILED DESCRIPTION

Certain aspects and features of the present disclosure relate to repairing wellbore line coatings. A wellbore line having a thermoplastic coating can be repaired, in-line, by passing the wellbore line through a die and setting section after the coating has been cleaned, heated, and recoated with either pre-heated thermoplastic material or a thermoset filling material. When the coating has minimal damage, such as simple cuts or cracks, the coating can be cleaned, heated, passed through a die, and set, without being recoated. A wellbore line can be a slickline, a wireline, or other line insertable into a wellbore. In some aspects, wellbore lines can be used to convey downhole tools. A wellbore line can be stored on a reel and can be unspooled while being inserted into a wellbore. A wellbore line can be spooled back onto the reel while being removed from the wellbore.

A wellbore line coating repair system can repair a line coating as the wellbore line is being spooled onto or unspooled from a reel. In some aspects, a wellbore line coating can be repaired as the wellbore line is pulled out of, or removed from, the wellbore. In alternate aspects, a wellbore line coating can be repaired as the wellbore line is being inserted into a wellbore. The ability to repair the line coating at the wellbore site can be an efficient manner of maintaining coating integrity.

In alternate aspects, the wellbore line coating repair system can repair a wellbore line coating as the wellbore line is being unspooled from a first reel and spooled onto a second reel. This reel-to-reel wellbore line coating repair system can be operated onsite, such as near a rig, or offsite, such as in a workshop.

Figure 1:
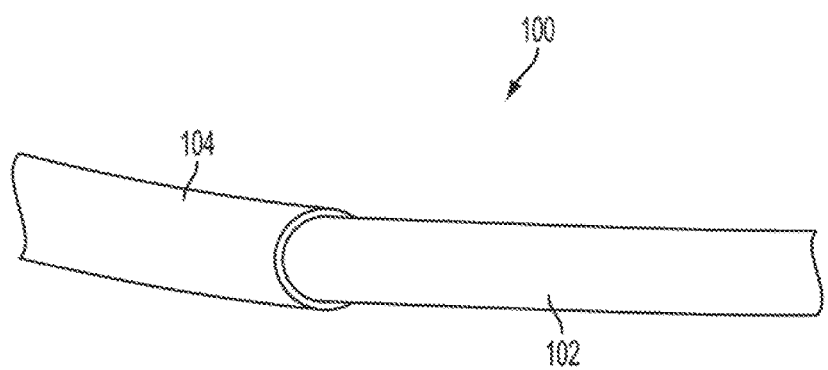
FIG. 1 is a diagram illustrating a wellbore line having a coating that is partially removed according to one aspect of the present disclosure.

FIG. 1 is a diagram illustrating wellbore line 100 having a coating 104 that is partially removed according to one aspect of the present disclosure. As shown, the wellbore line 100 includes an inner core 102 and a coating 104. The inner core 102 can include metal, composite materials, or other materials. The inner core 102 can include additional internal elements, such as fiber optic lines, individually-insulated conductors, annuluses, or other elements desirable in a wellbore line 100. The coating 104 can be a thermoplastic coating or other coating. It can be advantageous to provide a thermoplastic coating on wellbore lines 100 having a composite inner core.

As used herein, any reference to a wellbore line 100 or a coating 104 can be considered to be a reference to a section of wellbore line 100 or a section of coating 104, respectively.

In certain aspects, the wellbore line 100 can be approximately one quarter of an inch in diameter. In alternate aspects, the wellbore line 100 can be less than one quarter of an inch in diameter.

Figure 2:
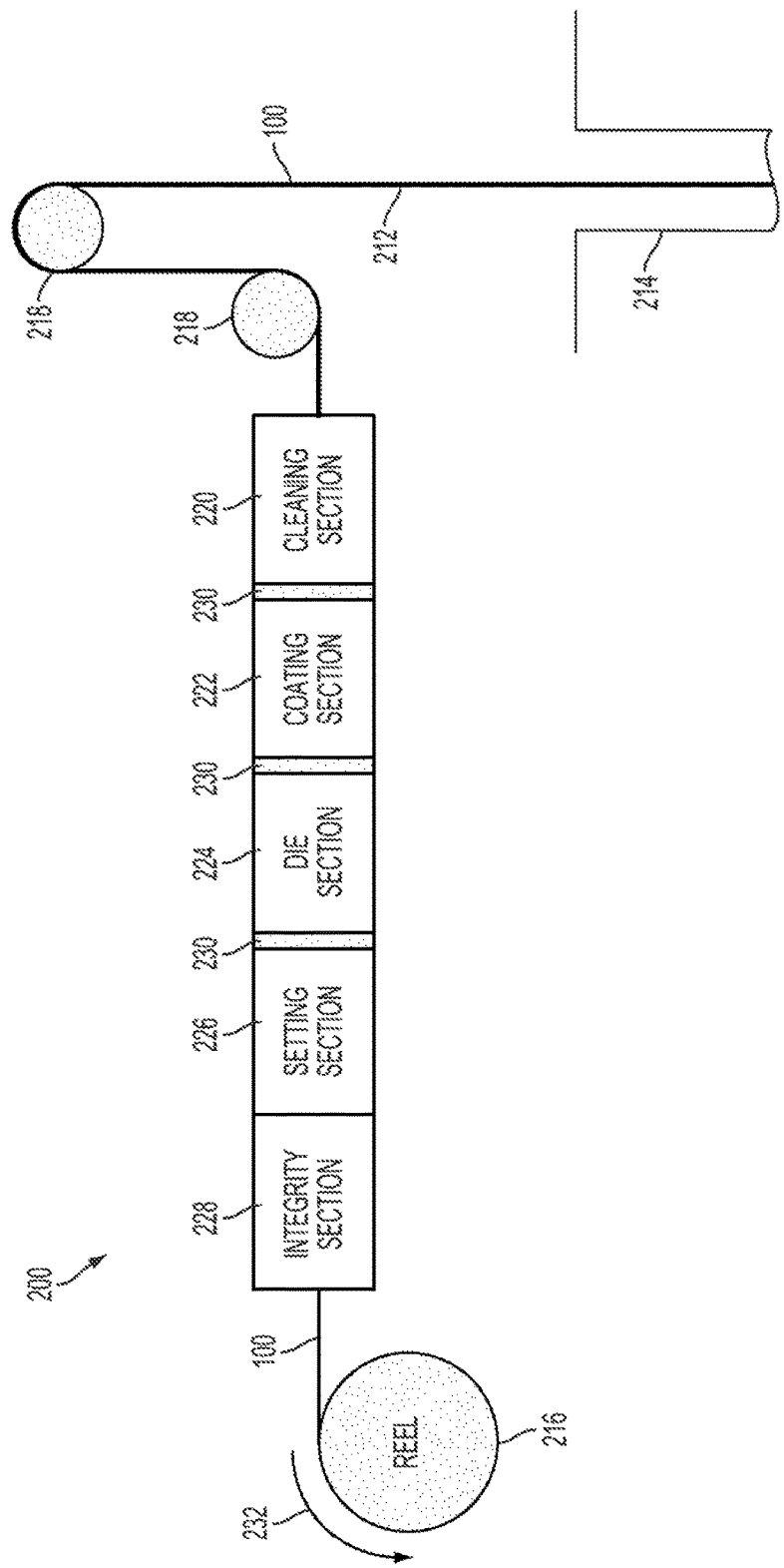
FIG. 2 is a diagram illustrating a wellbore line coating repair system usable in repairing a line as the line exits a wellbore according to one aspect of the present disclosure.

FIG. 2 is a diagram illustrating a wellbore line coating repair system 200 repairing a wellbore line 100 of FIG. 1. A wellbore line 100 can be removed from a wellbore 214 and spooled onto a reel 216. Having exited a wellbore 214, the wellbore line 100 can include contaminants 212 deposited on or otherwise present on the coating 104. These contaminants 212 can include debris and wellbore fluids. The wellbore line 100 can pass through one or more pulleys 218. The wellbore line 100 can be pulled through a cleaning section 220, a coating section 222, a die section 224, and a setting section 226. The wellbore line 100 can also optionally be pulled through an integrity section 228. The wellbore line 100 can be pulled through one or more centralizers 230 placed before, after, or within any of the sections listed above. The centralizers 230 can ensure the line passes through the sections in a manner such that the coating 104 is evenly distributed on the wellbore line 100.

The wellbore line coating repair system 200 can be removed from or placed on the wellbore line 100 while at least a portion of the wellbore line 100 is located in a wellbore 214. The wellbore line coating repair system 200 can include separable parts enabling the wellbore line coating repair system 200 to be removed from the wellbore line 100 without the need to thread an end of the wellbore line through the wellbore line coating repair system 200.

Arrow 232 represents the direction of travel of the wellbore line 100 if the wellbore line 100 is being removed from a wellbore 214 and spooled onto a reel 216. In alternate aspects, the direction of travel of the wellbore line 100 can be reversed such that the wellbore line 100 is being unspooled from the reel 216 and being inserted into the wellbore 214. In such aspects, the order of the sections can be reversed such that the wellbore line 100 would still travel through the cleaning section 220 before the coating section 222, and the coating section 222 before the die section 224.

The wellbore line coating repair system 200 can have a repairing direction defined as the direction which the wellbore line 100 must travel in order for the wellbore line coating repair system 200 to repair the wellbore line 100 (e.g., the direction indicated by arrow 232). The repairing direction can be the direction the wellbore line 100 must travel in order to pass through the cleaning section 220 before the coating section 222, and the coating section 222 before the die section 224. The wellbore line coating repair system 200 can be disabled while the wellbore line 100 is traveling in a direction opposite the repairing direction. For example, the wellbore line coating repair system 200 depicted in FIG. 2 can be disabled when the wellbore line 100 is being inserted into the wellbore 214 (e.g., opposite the direction of arrow 232).

In some aspects, a wellbore line coating repair system can repair a wellbore line 100 in both directions (e.g., repairing a wellbore line 100 both as it is spooled onto a reel 216 and unspooled from a reel 216) by combining multiple, individual wellbore line coating repair systems having respective, opposite repairing directions, where each of the individual wellbore line coating repair systems can be disabled when the wellbore line 100 is traveling opposite its respective repairing direction.

The wellbore line coating repair system 200 can be specifically used only with wellbore lines 100 that have been previously used within a wellbore 214. The wellbore line coating repair system 200 can be specifically used only with wellbore lines 100 having a coating 104 that has been damaged due to placement within a wellbore 214.

Figure 3A:
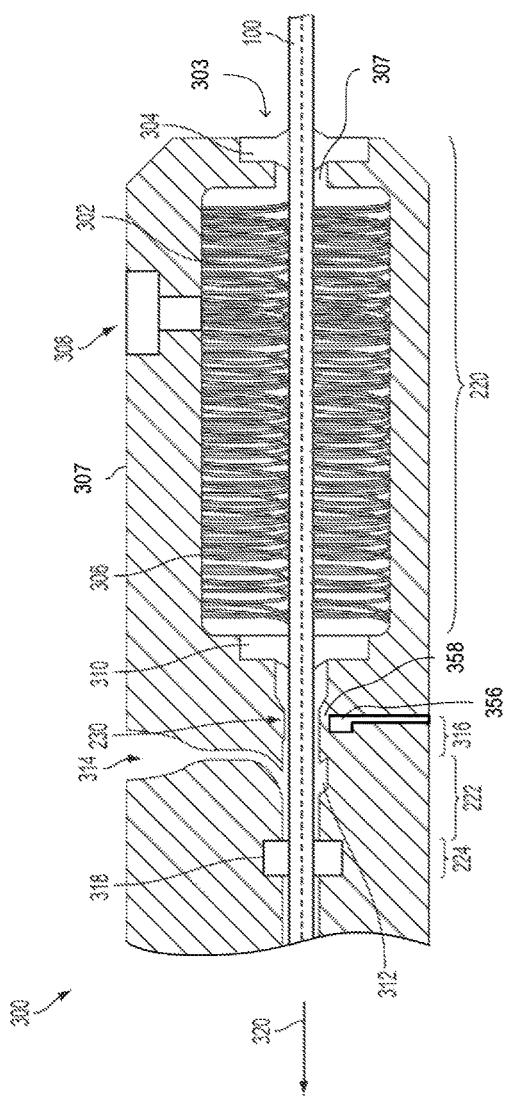
FIG. 3a is a diagram illustrating a first portion of a wellbore line coating repair system according to one aspect of the present disclosure.
Figure 3B:
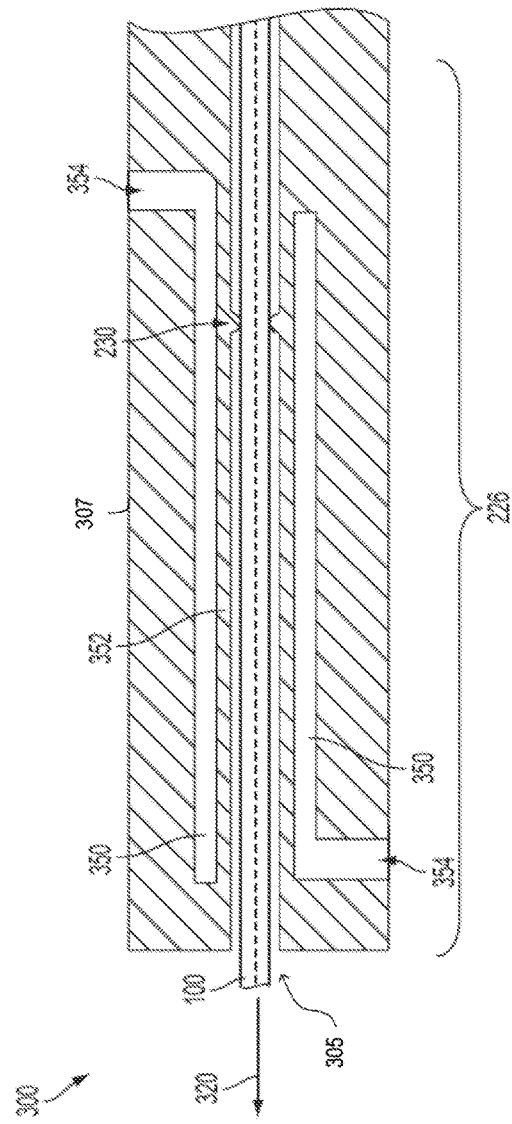
FIG. 3b is a diagram illustrating a second portion of the wellbore line coating repair system of FIG. 3a according to one aspect of the present disclosure.

FIGS. 3a-3b are diagrams illustrating a wellbore line coating repair system 300, according to one aspect of the present disclosure. FIG. 3b depicts a portion of the wellbore line coating repair system that can be located to the left of the portion shown in FIG. 3a. Arrow 320 represents the direction of travel of the wellbore line 100. The wellbore line coating repair system 300 can include a housing 301 having an entry opening 303 and an exit opening 305 defining a wellbore line pathway 307 through the housing 301. The housing 301 can include various sections along the wellbore line pathway 307, as described in further detail below, through which a wellbore line 100 can be pulled.

The cleaning section 220 can remove contaminants 212 from the coating 104. It can be desirable for the coating 104 to be clean before entering the coating section 222. The cleaning section 220 can include at least one cleaning element that is a mechanical cleaner (e.g., contact cleaners), a chemical cleaner, am acoustic cleaner, or another cleaners. The cleaning element can be positioned in contact with the pathway. Contact cleaners can include parts, such as brushes 302, wipers 304, blades, or other parts, that can physically remove contaminants 212 from the coating 104. Chemical cleaners can include chemical substances that aid in removing contaminants 212, such as wellbore fluid, from the line coating 104. Chemical cleaners can be applied to the coating 104 by running the wellbore line 100 through a cleaning chamber 306 having a bath of chemical cleaners. Chemical cleaners can be fed into the cleaning chamber 306 through a chemical input port 308. In one aspect, brushes 302 can be incorporated into the cleaning chamber 306 to aid in removing contaminants 212. Examples of other cleaners, such as ultrasonic cleaners 310 that can remove, or aid in removing contaminants 212, from the coating 104. The cleaning section 220 can include a flame- or spark-producing element that causes flammable contaminants 212 to burn off the coating 104. The cleaning section 220 can remove a small portion of the coating 104. Contaminants 212 or used chemical cleaners can be continuously or periodically removed from the cleaning section 220 through exit ports.

The wellbore line 100 can be pulled through a coating section 222. In the coating section 222, the wellbore line 100 can be pulled through a coating chamber 312 having a bath of repair material. The coating chamber 312 can be shaped to maintain the bath of repair material in contact with the wellbore line pathway 307. The bath of repair material can be a bath of thermoplastic resin or a bath of thermoset material. Pulling the wellbore line 100 through a cleaning section 220 prior to pulling the wellbore line 100 through the coating section 222 can reduce the amount of contaminants 212 that are incorporated into the bath of repair material. The coating chamber 312 can be fed from a coating input port 314. The wellbore line 100 can be pulled through a centralizer 230 prior to being pulled through the coating chamber 312.

The wellbore line 100 can be pulled through a bath of repair material that is heated thermoplastic resin. The wellbore line 100 can be pulled through a heating section 316. The heating section 316 can be positioned along the wellbore line pathway 307 and can include a heat source 356 separated from the wellbore line pathway 307 by a thermally conductive material 358. The wellbore line 100 can be first pulled through a heating section 316 capable of bringing the coating 104 to a temperature above or near the melting temperature of the coating material prior to being pulled through the bath of heated thermoplastic resin. As the wellbore line 100 is pulled through the bath of heated thermoplastic resin, the coating 104 can be heated to a temperature above the melting temperature of the coating material and the repair material can be deposited on the wellbore line by the existing coating 104 melting together with some of the thermoplastic resin in the bath to form a new coating 104. The heating section 316 can heat the coating 104 to a temperature above the melting temperature before the wellbore line 100 is pulled through the bath of heated thermoplastic resin. The wellbore line 100 can be pulled through a heating section 316 after being pulled through the coating section 222. It can be advantageous to heat the wellbore line 100 after it has been pulled through the coating section 222 in order to keep the coating from cooling too quickly.

The wellbore line 100 can then be pulled through the die section 224, as described in further detail below.

The wellbore line 100 can be pulled through a bath of repair material that is thermoset material, such as an epoxy or an adhesive. As the wellbore line 100 is pulled through the bath of thermoset material, the thermoset material can be deposited on the wellbore line 100 by covering the coating 104 and filling in cracks or other faults in the coating 104.

The wellbore line 100 can then be pulled through the die section 224, as described below.

The die section 224 can include a die 318. The die 318 can extrude or cut off excess repair material from the coating 104. The die 318 can ensure that as the wellbore line 100 exits the die section 224, the coating 104 is of a pre-determined diameter. In other words, the die 318 can shape the coating 104, including any repair material thereon, into a coating of a pre-determined diameter. The die 318 can ensure the coating 104 is of a uniform thickness. In some aspects, any excess material removed by the die section 224 can be collected and incorporated back into the bath of repair material. In alternate aspects, excess material removed by the die section 224 can be disposed of.

Continuing to FIG. 3b, after exiting the die section 224, the wellbore line 100 can be pulled through a setting section 226. The setting section 226 can set the repair material according to which repair material is used. When a thermoplastic repair material is used, the setting section 226 can help cool the coating 104 to a temperature below the glass transition temperature. In some aspects, the setting section 226 can include a setting fluid passage 350. The setting fluid passage 350 can be separated from the wellbore line 100 by a thermally conductive material 352. Setting fluid can enter the setting fluid passage 350 through a setting fluid input port 354, and can exit through a setting fluid output port (not shown). The setting fluid can be any fluid capable of setting the repair material.

In aspects where the repair material is a thermoplastic material, the setting section 226 can cool the wellbore line 100. In such aspects, the setting fluid can be a fluid that is capable of removing heat from the wellbore line 100, such as liquid nitrogen, cooled air, ambient air, water, or other fluids.

In aspects where the repair material is a thermoset material, the setting section 226 can set the repair material in various ways. In some aspects the setting section 226 can apply heat to the wellbore line 100. In such aspects, the setting fluid can be a fluid that is capable of applying heat to the wellbore line 100. In some alternate aspects, the setting section 226 can be devoid of setting fluid passages 350, and can instead apply heat through other means, such as electrical heaters. In some alternate aspects, the setting section 226 can apply radiation to set the thermoset material, instead of applying heat. In some alternate aspects, the setting section 226 can apply chemicals (e.g., a gas) to set the thermoset material.

The setting section 226 can include a centralizer 230.

In some alternate aspects, the setting section 226 can be an area where the wellbore line 100 is exposed to air. The setting section 226 can be devoid of coolant, setting fluid passages 350, and other structures. The setting section 226 can simply be a space between the exit of the die section 224 and the wellbore line 100 destination (e.g., a reel 216 or a wellbore 214).

In some alternate aspects, the wellbore line 100 can be pulled through the setting section 226 prior to being pulled through the die section 224. The die section 224 can cut off already-set repair material. Any already-set repair material removed by the die section 224 can be appropriately disposed of and not incorporated back into the bath of repair material.

FIG. 4 is a diagram illustrating a wellbore line coating repair system 400 for repairing a wellbore line 100 of FIG. 1, according to one aspect, where the wellbore line 100 can be pulled through both a first setting section 400a and a second setting section 400b. Arrow 402 indicates the direction of travel of the wellbore line 100. The wellbore line 100 can be pulled through the first setting section 400a, which can partially set the repair material, before being pulled through the die section 224 and then the second setting section 400b, which fully sets the repair material.

In some alternate aspects, the coating section 222 can apply repair material to the wellbore line 100 in manners other than a bath, such as via a spray jet 404. The coating chamber can include one or more spray jets 404 positioned to spray repair material onto the wellbore line 100. The spray jet 404 can fluidly connected to the coating input port 314.

Figure 5:
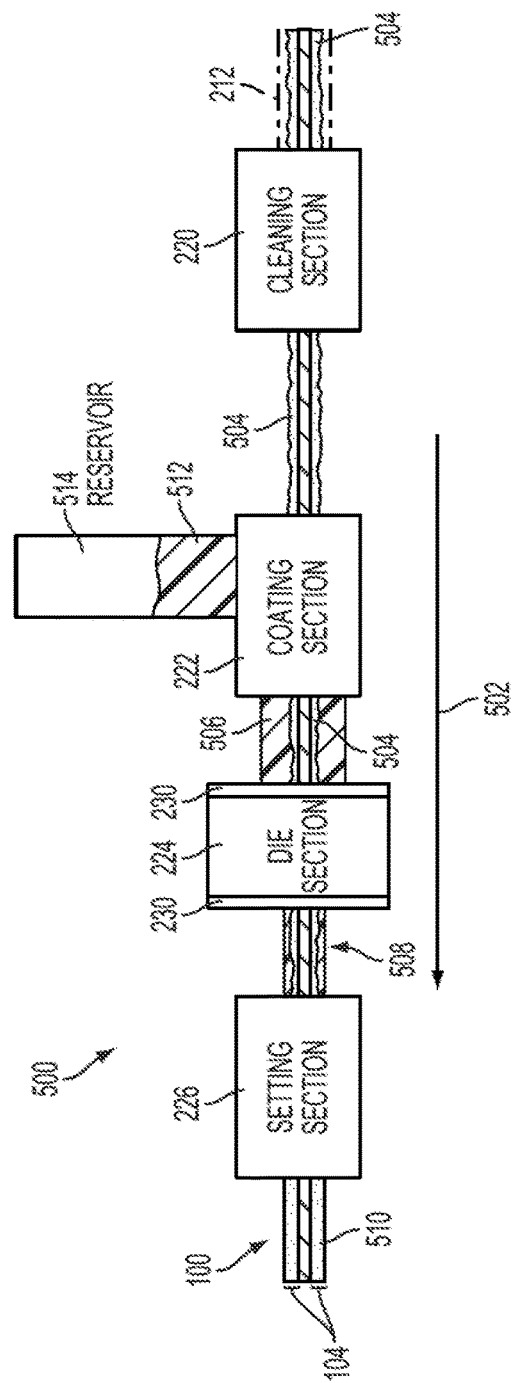
FIG. 5 is a partially expanded diagram illustrating a wellbore line coating repair system for repairing the wellbore line of FIG. 1, with the coating detail exaggerated for illustrative purposes, according to one aspect of the present disclosure.

FIG. 5 is a partially expanded diagram illustrating a wellbore line coating repair system 500 for repairing the wellbore line 100 of FIG. 1, with the coating 104 detail exaggerated for illustrative purposes, according to one aspect. The size of the coating 104 has been dramatically increased in FIG. 5 for illustrative purposes only, and is not drawn to scale. The wellbore line 100 can be pulled in direction 502. Before entering the cleaning section 220, the wellbore line 100 can include a damaged coating 504 and contaminants 212. After exiting the cleaning section 220, the contaminants 212 can be removed and the wellbore line 100 can include a damaged coating 504 as the wellbore line 100 enters the coating section 222. Wherever contaminants 212 are described as being removed from the line 100, not all of the contaminants 212 are necessarily removed from the line 100, due to practical limitations within the cleaning section 220. After exiting the coating section 222, the wellbore line 100 can include the damaged coating 504 covered in excess repair material 506 as the wellbore line 100 enters the die section 224. After exiting the die section 224, the wellbore line 100 can include a coating 104 of the appropriate size (e.g., thickness). While the damaged coating 504 and excess repair material 506 are shown as distinguishable in FIG. 5, for illustrative purposes, when a thermoplastic resin is used as the repair material, the damaged coating 504 and excess repair material 506 can be indistinguishable when exiting the coating section 222, because both the repair material 506 and the damaged coating 504 can be melted together. Upon exiting the setting section 226, the wellbore line 100 can have a repaired coating 510.

The coating section 222 can include a reservoir 514 of repair material 512. In some aspects, the reservoir 514 can include only repair material 512 that has not been previously used. In some aspects, the reservoir 514 can include only repair material 512 that has not been previously used on a wellbore line 100. In alternate aspects, the reservoir 514 can include repair material 512 that has been recycled from the coating section 222, die section 224, or elsewhere.

Figure 6:
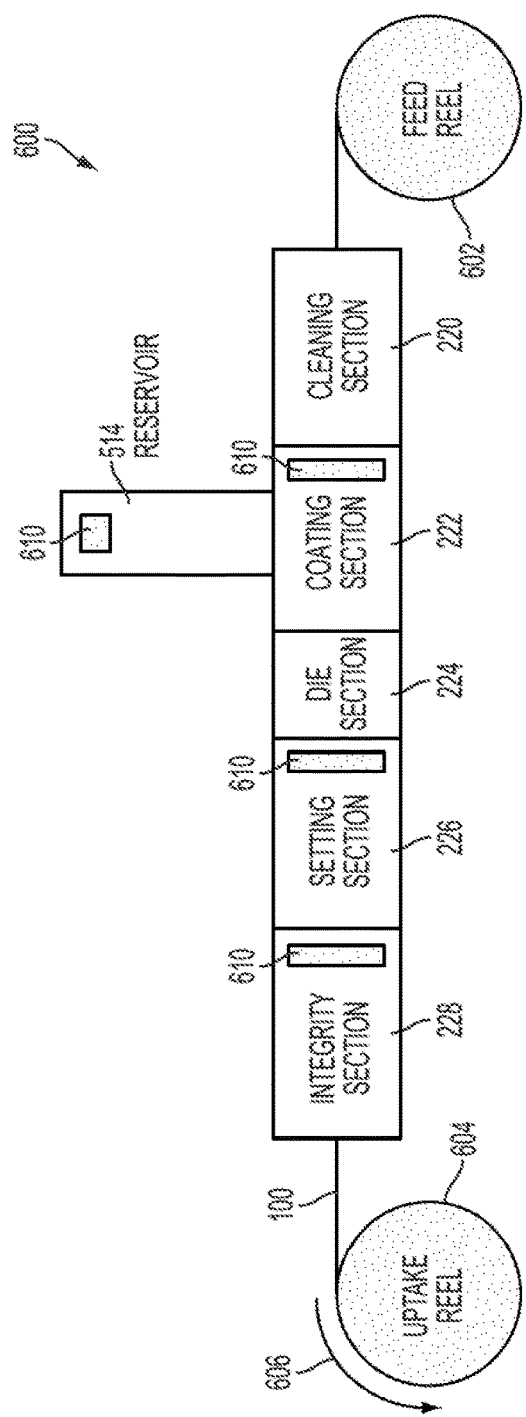
FIG. 6 is a diagram illustrating a reel-to-reel wellbore line coating repair system according to one aspect of the present disclosure.

FIG. 6 is a diagram illustrating a reel-to-reel wellbore line coating repair system 600 according to one aspect. The wellbore line 100 can enter the cleaning section 220 as the wellbore line 100 is being unspooled from a feed reel 602. The wellbore line 100 can pass through the coating section 222, die section 224, and setting section 226, as described above, and then be spooled onto an uptake reel 604. Arrow 606 indicates the direction of travel of the wellbore line 100.

In some aspects, not limited to reel-to-reel wellbore line coating repair systems 600, the quality of the repair material and/or the coating 104 can be measured by a sensor 610 that is a contamination detection sensor. The sensor 610 can be an X-ray diffraction device, an X-ray fluorescent device, or another device capable of determining the level of contamination of the repair material. The sensor 610 can be capable of determining the level of contaminants in a thermoplastic material, such as the heated repair material or the set coating 104. A sensor 610 can be incorporated in the coating section 222, such as in the reservoir 514, to monitor the level of contamination of the repair material. A sensor 610 located in the coating section 222 can be advantageous to detect contaminants 212 which could have been present on a wellbore line 100 that has passed through the coating section 222. A sensor 610 located in the coating section 222 can also be advantageous to detect contaminants 212 that are the result of recycling repair material. If the contamination level is above a pre-determined maximum level, the system can perform an action, such as logging an event or indicating that the repair material should be replaced and/or the coating section 222 cleaned.

A sensor 610 can be incorporated into the setting section 226 or into an integrity section 228, such that the coating 104 is analyzed after having been repaired. If the sensor 610 determines that the coating 104 has a contamination level above a pre-determined maximum level, the system can perform an action, such as logging an event or indicating that the system should be maintained, which can include replacement of the repair material. A sensor 610 in the setting section 226 or integrity section 228 can be used simultaneously with a sensor 610 in the coating section 222. It can be advantageous to use a sensor 610 in the setting section 226 or integrity section 228 over using a sensor in the coating section 222, as sensors incorporated into the coating section 222 might be more expensive due to the need to withstand harsher environments, such as greater temperatures (i.e., when heated thermoplastic is used) or greater pressures (i.e., when spray jets are used).

Figure 7:
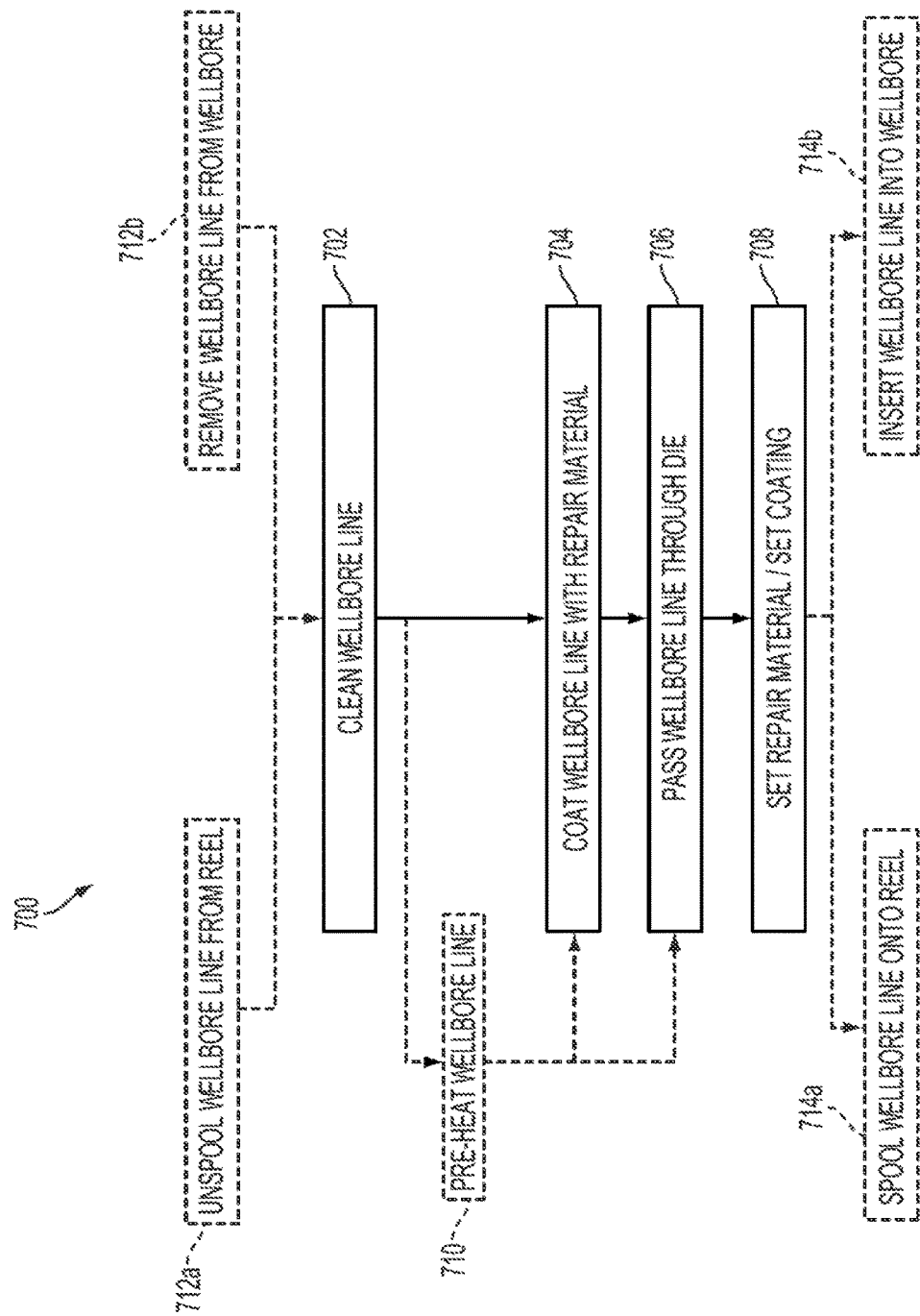
FIG. 7 is a flow chart of a method of repairing a wellbore line coating according to certain aspects to the present disclosure.

FIG. 7 is a flow chart depicting a wellbore line coating repair method 700, according to certain aspects of the present disclosure. A wellbore line 100 can be cleaned at block 702. The wellbore line 100 can be coated with a repair material at block 704. The wellbore line 100 can be passed through a die at block 706. The repair material can be set at block 708. The repair material can be set by cooling a thermoplastic material, heating a thermoset material, or other ways described above. Optionally, the wellbore line 100 can be pre-heated at block 710, thus pre-heating the coating 104 of the wellbore line 100. Optionally, prior to being cleaned at block 702, the wellbore line 100 can be either unspooled from a reel at block 712a or removed from a wellbore at block 712b. Optionally, after the repair material has set at block 708, the wellbore line 100 can be either spooled onto a reel at block 714a or inserted into a wellbore at block 714b.

In alternate aspects, the coating 104 of the wellbore line 100 can be heated, passed through a die, and cooled, without the use of any repair material. The coating 104 can have simple cuts or cracks. The presence of simple cuts or cracks in the coating 104 of the wellbore line 100 can be fixed without the addition of supplemental material repair material. The wellbore line 100 can be cleaned at block 702 and then pre-heated at block 710. The pre-heating occurring at block 710 can be sufficient to melt the coating 104 of the wellbore line 100. The wellbore line 100 can then be passed through a die at block 706. The coating 104 of the wellbore line 100 can then be set at block 708. In this aspect, since no repair material is deposited on the wellbore line 100, the coating 104 is cooled at block 708 to a temperature below the glass transition temperature of the coating 104. These aspects can include optional blocks 712a, 712b, 714a, and 714b as described above.

As used herein, any reference to a first element being "after" a second element means that the wellbore line passes the second element before passing the first element.

The foregoing description of the aspects, including illustrated aspects, has been presented only for the purpose of illustration and description and is not intended to be exhaustive or to be limiting to the precise forms disclosed. Numerous modifications, adaptations, and uses thereof will be apparent to those skilled in the art without departing from the scope of this disclosure.

As used below, any reference to a series of examples is to be understood as a reference to each of those examples disjunctively (e.g., "Examples 1-4" is to be understood as "Examples 1, 2, 3, or 4").

Example 1 includes a wellbore line coating repair system. The wellbore line coating repair system includes a cleaning section and a coating section. Wellbore line is receivable through the cleaning section for cleaning. The coating section has a path for the wellbore line to pass through repair material depositable on the wellbore line.

Example 2 includes the system in example 1 with a die section through which the wellbore line passes.

Example 3 includes the system of examples 1 or 2 with a setting section through which the wellbore line passes.

Example 4 includes the system of examples 1-3 where the repair material is a heated thermoplastic material.

Example 5 includes the system of example 4 with a setting section operable to cool the deposited thermoplastic material to a temperature below the glass transition temperature of the thermoplastic material.

Example 6 includes the system of examples 1-5 with a heating section operable to receive and heat the wellbore line.

Example 7 includes the system of examples 1-3 where the repair material is a thermoset material.

Example 8 includes the system of example 7 with a setting section operable to set the deposited thermoset material.

Example 9 includes the system of examples 1-8 with a sensor operable to detect a level of contamination of the repair material.

Example 10 includes the system of examples 1-9 with a sensor operable to detect a level of contamination present in a repaired coating of the wellbore line.

Example 11 includes the system of examples 1-10 where the wellbore line includes a damaged coating.

Example 12 includes a method of repairing the coating of a wellbore line. The method includes removing contaminants from a wellbore line, depositing a repair material on the wellbore line, shaping the repair material to a desired diameter, and setting the repair material.

Example 13 includes the method of example 12 including detecting a level of contamination of at least one of the repair material and a repaired coating of the wellbore line.

Example 14 includes the method of examples 12-13 where the repair material is a thermoplastic material and the setting includes cooling the repair material.

Example 15 includes the method of examples 12-14 including pre-heating a damaged coating of the wellbore line.

Example 16 includes the method of examples 12-13 or 15 where the repair material is a thermoset material.

Example 17 includes the method of examples 1-16 where the removing contaminants from the wellbore line occurs as the wellbore line is being unspooled from a reel.

Example 18 includes the method of examples 1-16 where the removing contaminants from the wellbore line occurs as the wellbore line is being removed from a wellbore.

Example 19 includes a system for repairing the coating of wellbore lines. The system includes a cleaning section operable to receive a wellbore line and remove contaminants from a damaged coating of the wellbore line. The system also includes a coating section having a path for the wellbore line to pass through heated thermoplastic material depositable on the wellbore line. Additionally, the coating section is operable to heat the damaged coating to a temperature at or above a melting point of the damaged coating. The system also includes a die section operable to receive a wellbore line with deposited thermoplastic material and remove excess deposited thermoplastic material. The wellbore line exits the die section with a coating having a predetermined thickness. The system also includes a cooling section operable to reduce the temperature of the coating to a temperature below a glass transition temperature of the thermoplastic material.

Example 20 includes the system of example 19 including a sensor operable to detect a level of contamination of either the heated thermoplastic material or the repaired coating.

Example 21 includes a system having a cleaning section operable to receive a wellbore line and remove contaminants from a damaged coating of the wellbore line. The system also includes a heating section operable to receive a wellbore line and heat the damaged coating to a melting point of the damaged coating. The system also includes a die section operable to receive the wellbore line and shape the damaged coating into a repaired coating having a pre-determined diameter. The system also includes a setting section operable to cool the repaired coating below a glass transition temperature of the repaired coating.

Example 22 includes the system of example 20 including a coating section having a path for the wellbore line to pass through heated thermoplastic material depositable on the wellbore line. The system also includes a sensor operable to detect a level of contamination of a material selected from the group consisting of the heated thermoplastic material and the repaired coating. The repaired coating of the system includes a portion of the heated thermoplastic material.

Example 23 includes a wellbore line coating repair system. The wellbore line coating repair system includes a cleaning section and a die section through which the wellbore line passes. Wellbore line is receivable through the cleaning section for cleaning.

Example 24 includes the system of example 23 with a heating section operable to heat a coating of the wellbore line to a temperature above the melting temperature of the coating.

Example 25 includes the system of examples 23 or 24, with a setting section through which the wellbore line passes, where the setting section is operable to cool the coating to a temperature below the glass transition temperature of the coating.

Example 26 includes the system of examples 23-25 with a sensor operable to detect a level of contamination of the coating.

Example 27 includes the system of examples 23-26 where the wellbore line includes a damaged coating.

Example 28 includes a method of repairing the coating of a wellbore line. The method includes removing contaminants from a wellbore line and shaping a coating of the wellbore line to a desired diameter.

Example 29 includes the method of example 28 including heating the coating to a temperature above a melting temperature of the coating.

Example 30 includes the method of examples 28-29 including cooling the coating to a temperature below the glass transition temperature of the coating.

Example 31 includes the method of examples 28-30 where the removing contaminants from the wellbore line occurs as the wellbore line is being unspooled from a reel.

Example 32 includes the method of examples 28-30 where the removing contaminants from the wellbore line occurs as the wellbore line is being removed from a wellbore.

What is claimed is:

1. A wellbore line coating repair system, comprising:
   a housing having an entry opening, an exit opening, and a wellbore line pathway defined between the entry opening and the exit opening;
   at least one cleaning element selected from the group consisting of a mechanical cleaner, a chemical cleaner, and an acoustic cleaner, the at least one cleaning element positioned within the housing and in contact with the wellbore line pathway; and
   a coating chamber located along the wellbore line pathway, the coating chamber in fluid communication with a coating input port, wherein the coating chamber is positioned on a wellbore line and is configured to coat a wellbore line during removal of the wellbore line from a wellbore or during insertion of the wellbore line into the wellbore.

2. The system of claim 1, additionally comprising a die section located along the wellbore line pathway.

3. The system of claim 2, additionally comprising a setting section located along the wellbore line pathway after the die section, the setting section having a setting fluid passage separated from the wellbore line pathway by a thermally conductive material.

4. The system of claim 2, additionally comprising a setting section located along the wellbore line pathway before the die section, the setting section having a setting fluid passage separated from the wellbore line pathway by a thermally conductive material.

5. The system of claim 1, wherein the coating chamber is in fluid communication with the coating input port through a spray jet positioned within the coating chamber.

6. The system of claim 1, additionally comprising a heating section positioned along the wellbore line pathway and having a heat source separated from the wellbore line pathway by a thermally conductive material.

7. The system of claim 1, additionally comprising a reservoir in fluid communication with the coating input port.

8. The system of claim 7, wherein the coating chamber is shaped to maintain a bath of repair material in contact with the wellbore line pathway.

9. The system of claim 7, additionally comprising a contamination detection sensor positioned within one of the reservoir and the coating chamber.

10. The system of claim 1, additionally comprising a contamination detection sensor positioned along the wellbore line pathway after the coating chamber.

11. The system of claim 1, wherein the at least one cleaning element includes the mechanical cleaner and the chemical cleaner.

12. A system, comprising:
    a housing having an entry opening, an exit opening, and a wellbore line pathway defined between the entry opening and the exit opening, wherein the housing is removably positioned on a wellbore line while at least a portion of the wellbore line is located within a wellbore;
    a cleaning section positioned in the housing, the cleaning section including at least one cleaning element selected from the group consisting of a mechanical cleaner, a chemical cleaner, and an acoustic cleaner, the at least one cleaning element in contact with the wellbore line pathway;

a heating section positioned in the housing and having a heat source separated from the wellbore line pathway by a first thermally conductive material;

a die section located along the wellbore line pathway; and a setting section located along the wellbore line pathway adjacent the die section, the setting section including a setting fluid passage separated from the wellbore line pathway by a second thermally conductive material.

13. The system of claim 12, additionally comprising:

a coating chamber located along the wellbore line pathway, the coating chamber in fluid communication with a coating input port;

a reservoir in fluid communication with the coating input port; and a contamination detection sensor positioned along the wellbore line pathway after the coating chamber, the coating chamber, or the reservoir.

14. The system of claim 13, wherein the reservoir is in fluid communication with the coating input port through a spray jet positioned within the coating chamber.

15. The system of claim 13, wherein the coating chamber is shaped to maintain a bath of repair material in contact with the wellbore line pathway.

16. The system of claim 13, further comprising a second contamination detection sensor positioned within one of the reservoir and the coating chamber.

17. The system of claim 12, wherein the setting section is located along the wellbore line pathway before the die section.

18. The system of claim 12, wherein the setting section is located along the wellbore line pathway after the die section.

19. The system of claim 12, wherein the setting section comprises a heating section having a heat source separated from the wellbore line pathway by the second thermally conductive material.

20. The system of claim 12, wherein the at least one cleaning element includes the mechanical cleaner and the chemical cleaner.

* * * * *